United States Patent
Ashary et al.

(10) Patent No.: US 10,566,646 B2
(45) Date of Patent: Feb. 18, 2020

(54) FUEL CELL STACK CONTAINING EXTERNAL ELECTRODE FOR CORROSION MITIGATION

(71) Applicant: BLOOM ENERGY CORPORATION, Sunnyvale, CA (US)

(72) Inventors: Adil A. Ashary, San Jose, CA (US); David Edmonston, Soquel, CA (US); Michael Petrucha, Santa Clara, CA (US); Martin Perry, Mountain View, CA (US); Tyler Dawson, Sunnyvale, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 16 days.

(21) Appl. No.: 15/954,901

(22) Filed: Apr. 17, 2018

(65) Prior Publication Data

US 2019/0051923 A1  Feb. 14, 2019

Related U.S. Application Data (60) Provisional application No. 62/542,368, filed on Aug. 8, 2017.

(51) Int. Cl.
| | | |
|---|---|---|
| *H01M 8/2485* | (2016.01) | |
| *H01M 8/2432* | (2016.01) | |
| *H01M 8/1246* | (2016.01) | |
| *H01M 8/124* | (2016.01) | |

(52) U.S. Cl.
CPC ....... *H01M 8/2485* (2013.01); *H01M 8/1246* (2013.01); *H01M 8/2432* (2016.02); *H01M 2008/1293* (2013.01); *H01M 2300/0074* (2013.01)

(58) Field of Classification Search
CPC ............ H01M 8/1246; H01M 8/2432; H01M 8/2485; H01M 2008/1293; H01M 2300/0074
See application file for complete search history.

(56) References Cited

U.S. PATENT DOCUMENTS

| 4,728,584 A | 3/1988 | Isenberg |
| 8,785,074 B2 | 7/2014 | Edmonston et al. |
| 8,877,399 B2 | 11/2014 | Weingaertner et al. |
| 2007/0196704 A1 | 8/2007 | Valensa et al. |
| 2008/0280178 A1 | 11/2008 | Spink et al. |
| 2014/0087286 A1* | 3/2014 | Fisher ............... H01M 8/04955 429/471 |
| 2014/0242492 A1 | 8/2014 | Edmonston et al. |
| 2016/0226093 A1 | 8/2016 | Edmonston et al. |

FOREIGN PATENT DOCUMENTS

| JP | 2008053078 A | 3/2008 |
| WO | WO 2007/087305 A3 | 8/2007 |
| WO | WO2013123319 A | 8/2013 |

OTHER PUBLICATIONS

International Search Report and Written Opinion of the International Searching Authority for International Application No. PCT/US2018/045106, dated Dec. 14, 2018, 9 pages.

* cited by examiner

*Primary Examiner* — Anca Eoff
(74) *Attorney, Agent, or Firm* — The Marbury Law Group PLLC (57) ABSTRACT

A method of operating a fuel cell system includes providing a fuel cell stack containing a plurality of fuel cells and interconnects, and first and second ceramic side baffles located on opposing sides of the fuel cell stack, and applying an electrical potential to an outer surface of at least one of the first and the second ceramic side baffles, such that the electrical potential is equal to or more negative than a lowest potential of any interconnect in the fuel cell stack or any electrically conductive fuel cell stack component.

20 Claims, 5 Drawing Sheets

FUEL CELL STACK CONTAINING EXTERNAL ELECTRODE FOR CORROSION MITIGATION

FIELD

The present invention is generally directed to fuel cell stacks and in particular to a stack of solid oxide fuel cells having an external electrode configured to mitigate the diffusion of alkali ions from a ceramic side baffle into the fuel cells.

BACKGROUND

Figure 1:
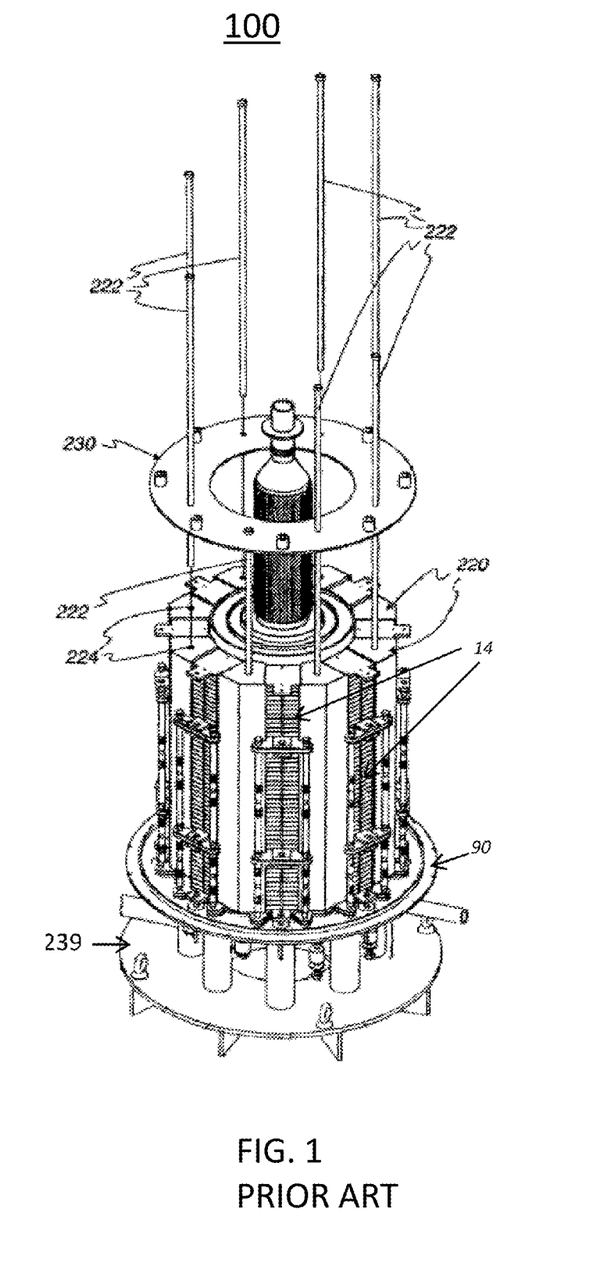
FIG. 1 illustrates a three dimensional view of a prior art fuel cell assembly.

U.S. application Ser. No. 11/656,563, filed on Jan. 23, 2007 and published as US published application 2007/0196704 A1 and incorporated herein by reference in its entirety, describes a fuel cell system 100 in which the solid oxide fuel cell (SOFC) stacks are located on a base, as shown in FIG. 1. Wedge shaped ceramic side baffles 220 (e.g., having a non-uniform thickness and a roughly triangular cross sectional shape in the horizontal direction) are located between adjacent fuel cell stacks 14 (or columns of fuel cell stacks). The baffles 220 serve to direct the cathode feed into the cathode flow paths and to fill the space between adjacent stacks so that the cathode feed passes through each of the stacks 14, rather than bypassing around the longitudinal sides of the stacks 14. The baffles 220 are held in place by tie rods 222 that pass through closely fitting bores 224 centrally located in each of the baffles 220. Preferably, the baffles 220 are electrically non-conductive and made as one unitary piece from a suitable ceramic material. FIG. 1 also shows fuel distribution manifolds between the stacks in the stack column and fuel inlet and exhaust conduits connected to the manifolds.

In this prior art system, the SOFC stacks maintain a compressive load. The compressive load is maintained by upper pressure plate 230, tie rods 222, lower pressure plate 90 and a compression spring assembly located below the lower pressure plate 90. The compression spring assembly applies a load directly to the lower pressure plate 90 and to the upper pressure plate 230 via the tie rods 222.

Figure 2:
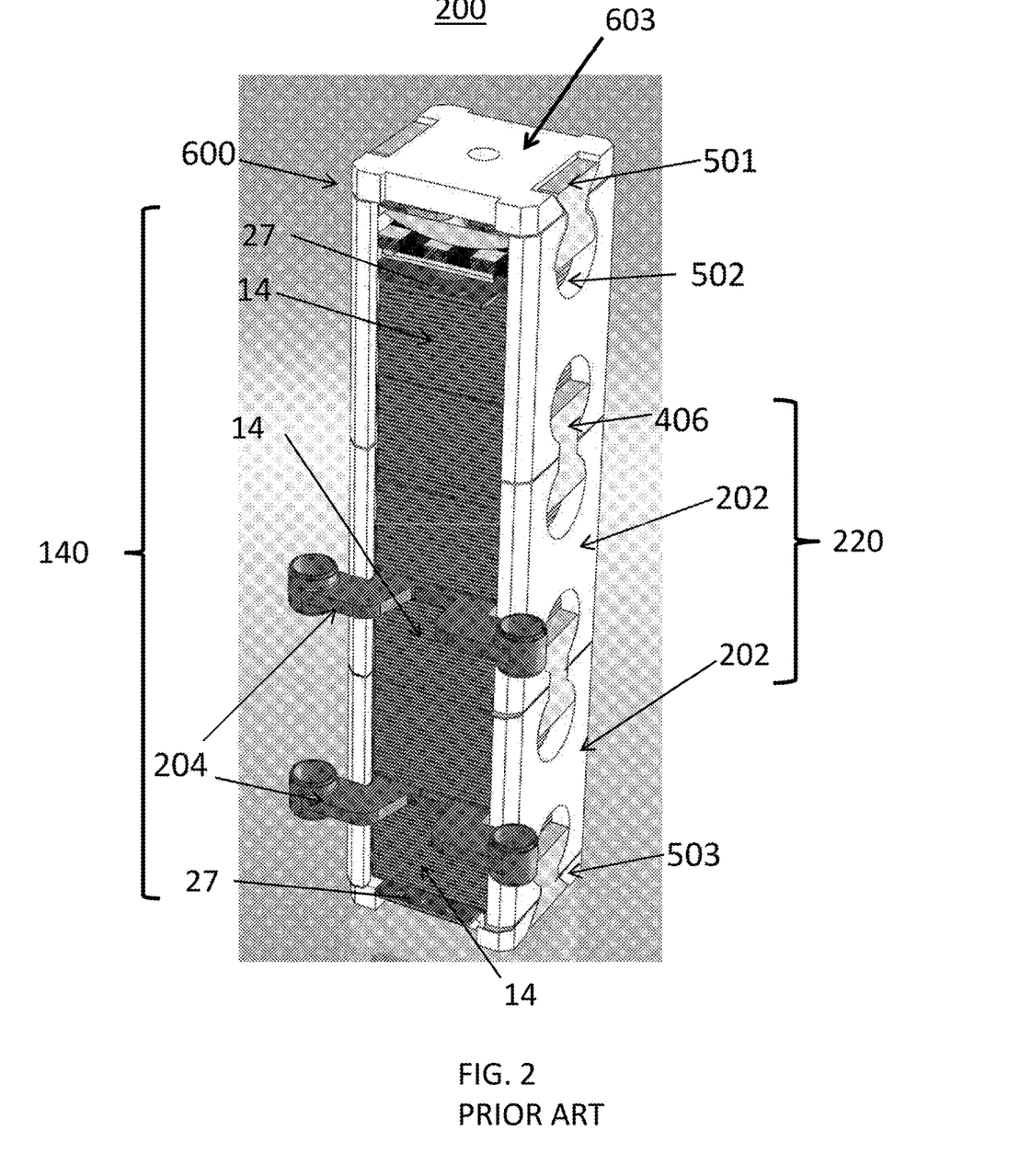
FIG. 2 illustrates a three dimensional view of another prior art fuel cell stack assembly according.

FIG. 2 illustrates another prior art fuel cell stack assembly 200 described in U.S. application Ser. No. 15/008,726, filed on Jan. 28, 2016 and published as U.S. published application US 2016/0226093 A1 and incorporated herein by reference in its entirety. Referring to FIG. 2, the fuel cell stack assembly 200 includes a fuel cell stack column 140, side baffles 220 disposed on opposing sides of the column 140, a lower block 503, and a compression assembly 600 including an upper block 603. The column includes three fuel cell stacks 14, fuel manifolds 204 disposed between the fuel cell stacks 14, and termination plates 27 disposed on opposing ends of the column 140. The fuel cell stacks 14 include a plurality of fuel cells stacked upon one another and separated by interconnects. A plurality of the fuel cell stack assemblies 200 may be attached to a base 239, as shown in FIG. 1.

An exemplary fuel manifold 204 is described in the U.S. application Ser. No. 11/656,563 noted above. Any number of fuel manifolds 204 may be provided between adjacent end plates of adjacent fuel cells of the fuel cell stacks 14, as desired.

The side baffles 220 connect the upper block 603 of the compression assembly 600 and the lower block 503. The side baffles 220, the compression assembly 600, and the lower block 503 may be collectively referred to as a "stack housing". The stack housing is configured to apply a compressive load to the column 140. The configuration of the stack housing eliminates costly feed-throughs and resulting tie rod heat sinks and uses the same part (i.e., side baffle 220) for two purposes: to place the load on the stacks 14 and to direct the cathode feed flow stream (e.g., for a ring shaped arrangement of stacks shown in FIG. 1, the cathode inlet stream, such as air or another oxidizer may be provided from a manifold outside the ring shaped arrangement through the stacks and the exit as a cathode exhaust stream to a manifold located inside the ring shaped arrangement). The side baffles 220 may also electrically isolate the fuel cell stacks 14 from metal components in the system. The load on the column 140 may be provided by the compression assembly 600, which is held in place by the side baffles 220 and the lower block 503. In other words, the compression assembly 600 may bias the stacks 14 of the column 140 towards the lower block 503.

The side baffles 220 are plate-shaped rather than wedge-shaped and include baffle plates 202 and ceramic inserts 406 configured to connect the baffle plates 202. In particular, the baffle plates 202 include generally circular cutouts 502 in which the inserts 406 are disposed. The inserts 406 do not completely fill the cutouts 502. The inserts 406 are generally bowtie-shaped, but include flat edges 501 rather than fully rounded edges. Thus, an empty space remains in the respective cutouts 502 above or below the inserts 406.

The side baffles 220 and baffle plates 202 have two major surfaces and one or more (e.g., four) edge surfaces. One or more of the edge surfaces may have an area at least 5 times smaller than each of the major surfaces. Alternatively, one or more edge surfaces may have an area at least 4 times or 3 times smaller than at least one of the major surfaces. Preferably, the baffle plates 202 have a constant width or thickness, have a substantially rectangular shape when viewed from the side of the major surface, and have a cross sectional shape which is substantially rectangular. In alternative embodiments, the ceramic side baffles 220 are not rectangular, but may have a wedge shaped cross-section. That is, one of the edge surfaces may be wider than the opposing edge surface. However, unlike the prior art baffles, which completely fill the space between adjacent electrode stacks 14, the side baffles 220 of this embodiment are configured so that there is space between side baffles 220. In other words, the side baffles 220 of this embodiment do not completely fill the space between adjacent columns 140. In other embodiments, wedge-shaped metal baffles may be inserted between adjacent side baffles 220, similar to the configuration shown in FIG. 1.

Generally, the side baffles 220 are made from a high-temperature tolerant material, such as alumina or other suitable ceramic. In various embodiments, the side baffles 220 are made from a ceramic matrix composite (CMC). The CMC may include, for example, a matrix of aluminum oxide (e.g., alumina), zirconium oxide or silicon carbide. Other matrix materials may be selected as well. The fibers may be made from alumina, carbon, silicon carbide, or any other suitable material. The lower block 503 and the compression assembly 600 may also be made of the same or similar materials. If the baffles are made from alumina or an alumina fiber/alumina matrix CMC, then this material is a relatively good thermal conductor at typical SOFC operating temperatures (e.g., above 700° C.). If thermal decoupling of neighboring stacks or columns is desired, then the baffles can be made of a thermally insulating ceramic or CMC material.

Other elements of the compression housing, such as the lower block 503 and the compression assembly 600 may also be made of the same or similar materials. For example, the lower block 503 may comprise a ceramic material, such as alumina or CMC, which is separately attached (e.g., by the inserts, dovetails or other implements) to the side baffles 220 and to a system base 239.

Figure 3:
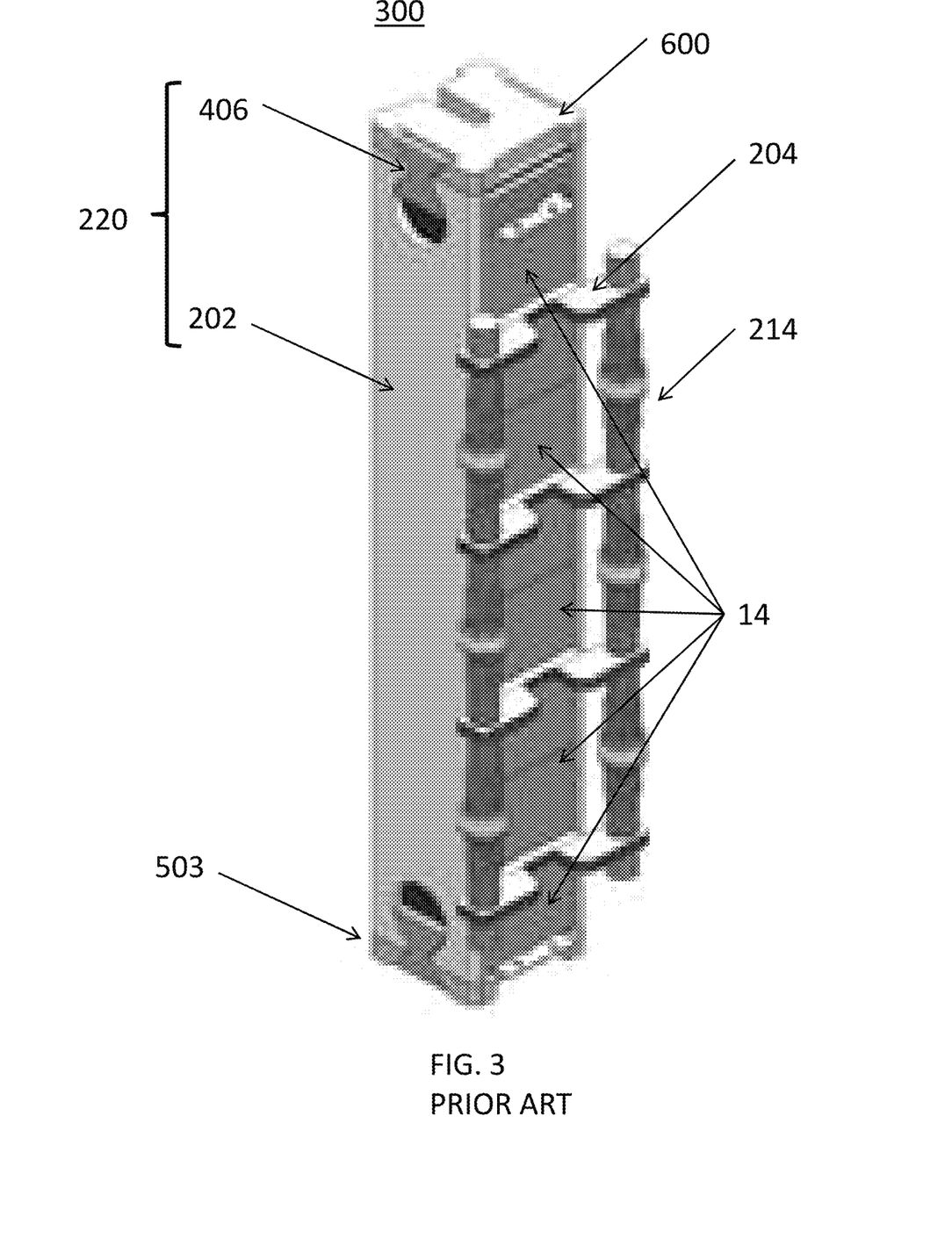
FIG. 3 illustrates a three dimensional view of another prior art fuel cell stack assembly.

FIG. 3 illustrates another prior art fuel cell stack assembly 300 described in U.S. application Ser. No. 15/008,726. The fuel cell stack assembly 300 is similar to the fuel cell stack assembly 200, so only the differences therebetween will be discussed in detail. Similar elements have the same reference numbers. Fuel rails 214 (e.g. fuel inlet and outlet pipes or conduits) connect to fuel manifolds 204 located between the stacks 14 in the column.

Referring to FIG. 3, the fuel cell stack assembly 300 includes side baffles 220 disposed on opposing sides of the column of fuel cell stacks 14. However, each of the side baffles 220 includes only a single baffle plate 202, rather than the multiple baffle plates 202 of the fuel cell stack assembly 200. In addition, the side baffles 220 include ceramic inserts 406 to connect the baffle plates 202 to a compression assembly 600 and a lower block 503.

SUMMARY

An embodiment provides a method of operating a fuel cell system comprising providing a fuel cell stack containing a plurality of fuel cells and interconnects, and first and second ceramic side baffles located on opposing sides of the fuel cell stack, and applying an electrical potential to an outer surface of at least one of the first and the second ceramic side baffles, such that the electrical potential is equal to or more negative than a lowest potential of any interconnect in the fuel cell stack or any electrically conductive fuel cell stack component.

Another embodiment provides a fuel cell system, comprising a fuel cell stack comprising a plurality of fuel cells and interconnects, first and second ceramic side baffles located on opposing sides of the fuel cell stack and at least one external electrode is located on an outer surface of at least one of the first or second ceramic side baffles. The at least one external electrode is configured to apply an electrical potential to the outer surface of at least one of the first and the second ceramic side baffles, wherein the electrical potential is equal to or more negative than a lowest potential of any interconnect in the fuel cell stack or any electrically conductive fuel cell stack component.

DETAILED DESCRIPTION

The present inventors realized that the ceramic materials used for the side baffles, bottom blocks and ceramic felt materials for solid oxide fuel cell (SOFC) stacks include sodium and other alkali and/or alkali earth metals that may become mobile at high temperatures. The sodium and/or other light metals may diffuse or electromigrate under a potential gradient from the side baffles, bottom blocks and ceramic felt into the fuel cell stack and corrode the fuel cell stack components, such as chromium-iron alloy interconnects in the stacks. The present inventors observed that the fuel cell stacks with the highest negative potential in a column of fuel cell stacks are preferentially corroded.

Embodiments of the present disclosure include a fuel cell stack in which an electrically conductive electrode is provided in electrical contact with the at least one ceramic side baffle located on the side of the fuel cell stack or on the side of a column of fuel cell stacks. In operation of the stack or column, this external electrode is configured to have the same or a more negative potential than the most negative potential in the fuel cell stack or column. In an embodiment, the fuel cell stack or column of stacks is located on a ceramic bottom block. An external electrode configured to have the same or more negative potential may also be provided on the bottom block in addition to on the side baffle(s). The application of a potential that is the same as or more negative than the most negative potential in the stack or column of stacks to the external electrode may prevent or reduce the diffusion of sodium or other alkali or alkali earth metals from the ceramic side baffle toward the stack, which prevents or reduces corrosion of components of the fuel cell stack.

In one embodiment, the electrode physically contacts the outer face of the ceramic baffle plate(s). The outer face is the outer surface of the ceramic baffle plate which faces away from the nearest fuel cell stack or column.

The application of a more negative potential on the outer face of the ceramic draws sodium (and other similar light metal contaminants) away from the stack or column, i.e. toward the external electrode. The application of a more negative potential or a potential equal to the most negative potential in the stack or column may therefore prevent or reduce the corrosion of stack or column due to reaction of sodium (or other light metal contaminants) with the stack components, such as the metal alloy interconnects. In the case of the application of a higher negative potential on the external electrode, the sodium arriving at the outer surface of the side baffle may react with chrome vapors in the system or with the chrome oxide on the external electrode. This may result in the formation of sodium chromate on the outer surface of the side baffle. However, formation of sodium chromate on the outer side of the side baffle does not interfere with the operation of the stack or column. In the case in which the potential on the external electrode is equal to the most negative potential in the stack, a gradient in electric field is formed between those cells or stacks of cells with a more positive potential than the external electrode. This gradient in electric field causes electromigration of positive ions, such as $Na^+$, $Mg^{2+}$, $Ca^{2+}$, etc. toward the external electrode. For the stack (or portion of the stack) that has the same potential as the external electrode, no gradient in potential is formed and therefore there is no driving force for the electromigration of sodium or other light metal ions toward the stack or the external electrodes.

Figure 4A:
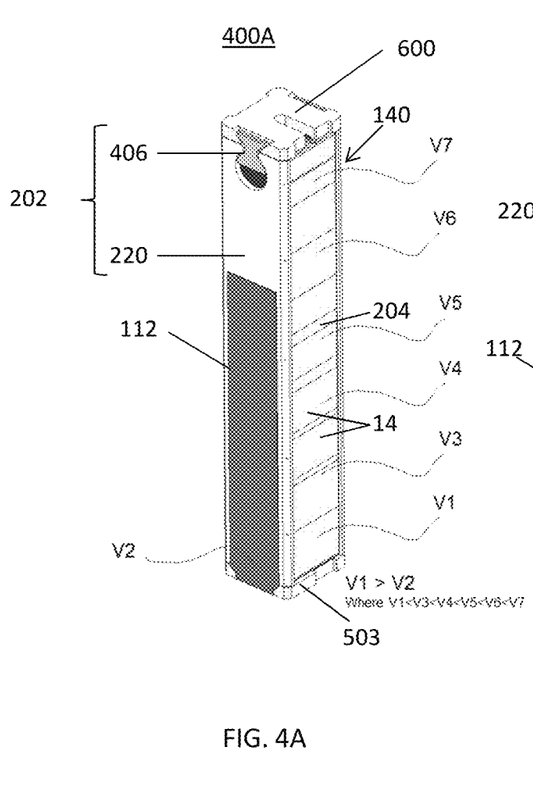
FIG. 4A is a perspective drawing of a fuel cell stack according to an embodiment.

FIG. 4A illustrates a fuel cell stack assembly 400A according to one embodiment of the present disclosure. The assembly 400A may be similar to the assembly 200 or 300 described above, and similar elements are not described in this section again. The assembly 400A includes a fuel cell stack column 140, side baffles 220 disposed on opposing sides of the column 140, a lower block 503, and a compression assembly 600 including an upper block. The column includes plural fuel cell stacks 14, optional fuel manifolds 204 disposed between the fuel cell stacks 14, and termination plates (shown in FIG. 2) disposed on opposing ends of the column 140. The fuel cell stacks 14 include a plurality of fuel cells stacked upon one another and separated by interconnects. A plurality of the fuel cell stack assemblies 400A may be attached to a base similar to that shown in FIG. 1.

An embodiment of a column 140 of stacks 14 of solid oxide fuel cells with an external electrode 112 is illustrated in FIG. 4A. In the embodiment illustrated in FIG. 4A, the column 140 includes a plurality of fuel cell stacks 14. The column 140 of fuel cell stacks 14 may include more or fewer fuel cell stacks 14 as desired. During operation of the assembly 400A to generate electricity at an elevated temperature above 700 degrees C., each of the stacks 14 in the column 140 has a respective electrical potential (i.e., voltage) V1, V3-V7. In this example, the potential (i.e., voltage) V2 applied to the external electrode 112 is more negative than the lowest potential V1 of the stack 14 (e.g., the lowest stack 14) in the column 140 (i.e., V2<V1). In one embodiment shown in FIG. 4A, the potential of each stack 14 increases (i.e., is increasingly more positive) from bottom to the top of the column 140 (i.e. V1<V3<V4<V5<V6<V7). However, other voltages may be used.

The external electrode 112 may comprise any suitable electrically conductive material, such as a metal or metal alloy, such as chromium, tungsten, titanium, tantalum, titanium nitride, Inconel (e.g., Inconel 800 alloy), etc. The external electrode 112 in the embodiment of FIG. 4A is not electrically connected to the stacks 14 of the column 140 or to any other hot box components.

In the embodiment shown in FIG. 4A, the external electrode 112 may be a single electrically conductive strip that contacts the outer faces of two ceramic baffle plates 220 of two side baffles 202 on opposing sides of the column 140. The strip may extend under the ceramic bottom block 503 to contact the outer surfaces of two baffle plates 220 of the two ceramic side baffles 202. The thickness of the strip may be 0.5 to 4 mm, such as 1 to 2 mm. Alternatively, two or three separate metal strips may be attached to the two side baffles 202 and optionally under the bottom block 503.

Figure 5:
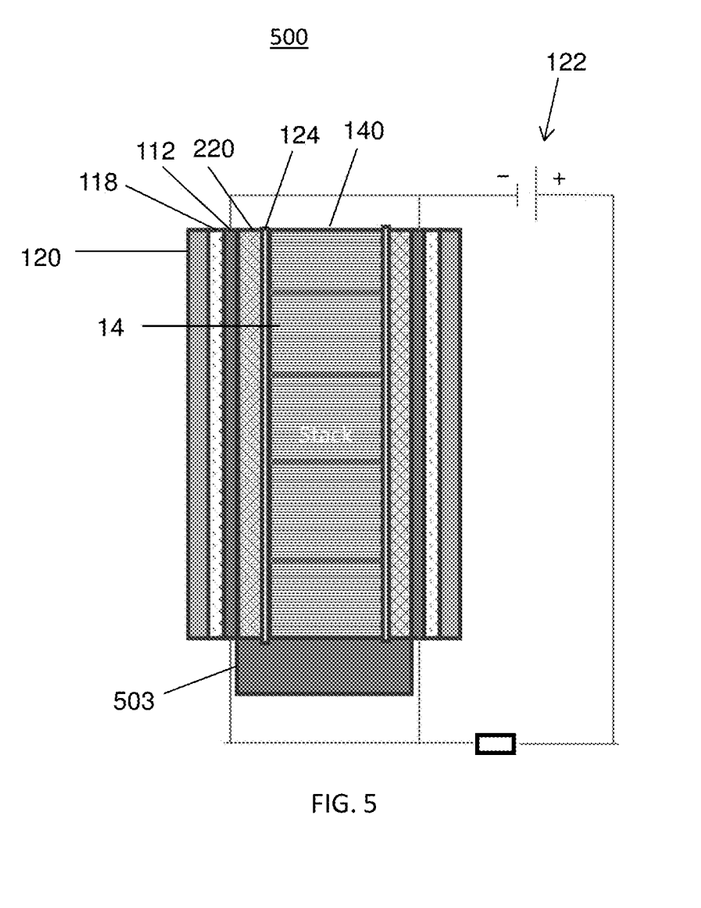
FIG. 5 is a side schematic drawing illustrating a portion of a fuel cell system according to an embodiment.

As illustrated in FIGS. 4A and 5, to apply a more negative potential to the external electrodes 112 than the stacks 14, the external electrode(s) 112 are connected to an external or internal power source 122. That is, the power source may be located internal to the fuel cell system or external from the system. For example, the power source 122 may be a battery, the electric grid or a down converted electrical output of a power conditioning module connected to the fuel cell module 400.

Figure 4B:
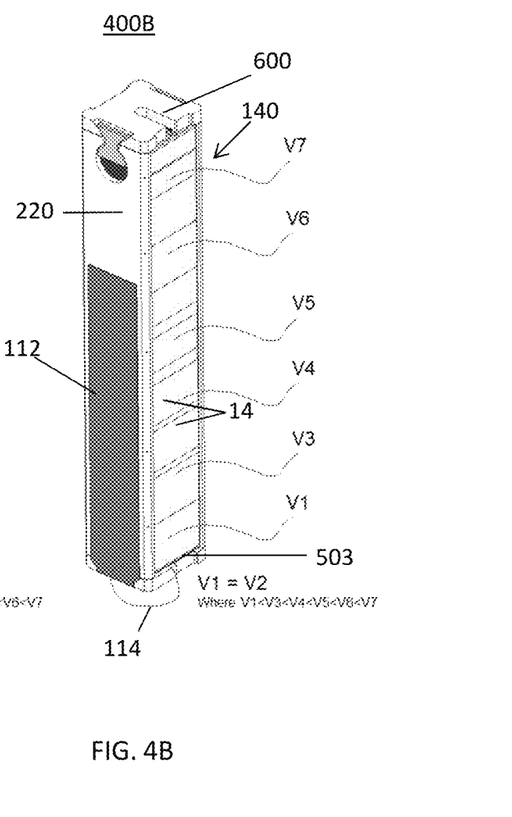
FIG. 4B is a perspective drawing of a fuel cell stack according to another embodiment.

In another embodiment illustrated in FIG. 4B, the same potential is applied to the external electrode 112 as the most negative part of the column 140 (e.g., the stack 14 having the most negative potential. An electrical lead 114 may be connected from the external electrode 112 to the interconnect or another fuel cell stack or column component, such as an end plate, current collector, fuel manifold or termination plate with the most negative potential in the column. In this case, V1=V2 and the stack 14 with the most negative potential in the column provides the voltage to the external electrode 112. In this case, a separate power source 122 may be omitted. In an embodiment, the electrical potential is equal to or more negative than a lowest potential of any interconnect in the fuel cell stack or electrically conductive fuel cell stack or column component. Electrically conductive fuel cell stack or column component may include, but are not limited to, termination plate, end plate, fuel manifold and current collector that are in contact with the column and in one embodiment can carry the negative most potential of the last interconnect.

In a configuration where the corrosion mainly occurs at stack(s) 14 at the bottom of the column 140, the external electrode(s) 112 may extend along the side baffle 202 to a height which is less than the total height of the entire column 140 (i.e., along only a portion of the side baffle height). For example, in a column with more than two stacks 14 of fuel cells, the external electrode(s) 112 may be one or two stacks high along the sides of the column 140. In other electrical configurations where the corrosion occurs at the top of the column and/or on a side of column, the external electrode(s) 112 contact the side baffle at the location of the corrosion.

In another embodiment shown in FIG. 5, the external electrode(s) 112 may extend along the side baffle 202 to a height which is the same as or greater than the total height of the entire column 140 (i.e., along the entire side baffle height).

In the module 500 of the embodiment of FIG. 5, the external electrode(s) 112 are electrically isolated from the stacks 14 in the column 140 and other hotbox components such the metallic inter-stack baffles 120. The inter-stack baffles 120 may be wedge-shaped metal or metal alloy (e.g., Inconel) baffles that are inserted between adjacent side baffles 220, similar to the configuration shown in FIG. 1. The inter-stack baffles 120 separate adjacent columns 140 of stacks 14 of fuel cells in a SOFC system that has multiple columns 140 of fuel cells. To achieve electrical isolation, a ceramic dielectric layer 118 (e.g., electrically insulating CMC material or ceramic felt) may be added between the inter-stack baffle 120 and the external electrode 112 on the side of the side baffle 220.

The module 500 optionally includes a ceramic felt 124 located between the fuel cell stacks 14 and the side baffles 202. The ceramic felt 124 helps prevent to the flow of air and/or fuel from leaking out the sides of the fuel cells and thereby helps guide the air and fuel through the fuel cell stacks 14.

In another embodiment, the external electrodes 112 may be protected against high temperature oxidation and corrosion by an aluminizing treatment. The aluminizing treatment forms an aluminum coating which upon oxidizing forms a protective alumina coating that prevents corrosion damage to the underlying external electrode 112.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A method of operating a fuel cell system, comprising:
providing a fuel cell stack comprising a plurality of fuel cells and interconnects, and first and second ceramic side baffles located on opposing sides of the fuel cell stack; and
applying an electrical potential to an outer surface of at least one of the first and the second ceramic side baffles, wherein the electrical potential is equal to or more negative than a lowest potential of any interconnect in the fuel cell stack or any electrically conductive fuel cell stack component.

2. The method of claim 1, wherein:
at least one external electrode is located on the outer surface of at least one of the first or second ceramic side baffles; and
the electrical potential is provided to the at least one of the first and the second ceramic side baffles through the at least one external electrode.

3. The method of claim 2, wherein:
the at least one external electrode is located on outer surfaces of both the first and second ceramic side baffles; and
the electrical potential is provided to both the first and the second ceramic side baffles through the at least one external electrode.

4. The method of claim 3, wherein:
the at least one external electrode is electrically connected to an external power supply;
the at least one external electrode is not electrically connected to the fuel cell stack; and
the electrical potential is more negative than the lowest potential of any of the interconnects in the fuel cell stack or the electrically conductive fuel cell stack component.

5. The method of claim 4, wherein the at least one external electrode comprises a single electrically conductive strip which contacts the outer surfaces of both the first and second ceramic side baffles and which extends between the outer surfaces of both the first and second ceramic side baffles under a ceramic bottom block located below the fuel cell stack.

6. The method of claim 2, wherein the at least one external electrode is electrically connected to an interconnect of the fuel cell stack having the lowest potential of all interconnects in the fuel cell stack or to the electrically conductive fuel cell stack or column component such that the electrical potential is equal to the lowest potential of any interconnect in the fuel cell stack or the electrically conductive fuel cell stack component.

7. The method of claim 2, wherein:
the fuel cells comprise solid oxide fuel cells;
the fuel cell stack is located in a first column of a plurality of columns of fuel cell stacks;
the outer surfaces of the first and the second ceramic baffles face away from the first column;
the first and second ceramic side baffles extend along an entire height of the first column; and
the plurality of columns of fuel cell stacks are separated by inter-stack baffles.

8. The method of claim 7, wherein the at least one electrode extends along only a portion of the outer surface of at least one of the first and second ceramic side baffles to a height which is less than a total height of the first entire column.

9. The method of claim 7, wherein the at least one electrode extends along an entire outer surface of at least one of the first and second ceramic side baffles to a height which is equal to a height of the first entire column.

10. The method of claim 7, wherein:
an alumina coating is located on the at least one external electrode;
a dielectric is located between the ceramic side baffles and the inter-stack baffles;
the dielectric comprises a ceramic felt or a ceramic matrix composite;
the inter-stack baffles comprise a metal or metal alloy; and
a dielectric felt seal is located between the fuel cell stack and the first ceramic side baffle.

11. The method of claim 1, wherein applying the electrical potential prevents or reduces diffusion of alkali or alkali earth metal from the first and second ceramic side baffles to the fuel cell stack, which prevents or reduces corrosion of components of the fuel cell stack.

12. A fuel cell system, comprising:
a fuel cell stack comprising a plurality of fuel cells and interconnects;
first and second ceramic side baffles located on opposing sides of the fuel cell stack; and
at least one external electrode is located on an outer surface of at least one of the first or second ceramic side baffles, wherein the at least one external electrode is configured to apply an electrical potential to the outer surface of at least one of the first and the second ceramic side baffles, wherein the electrical potential is equal to or more negative than a lowest potential of any interconnect in the fuel cell stack or any electrically conductive fuel cell stack component.

13. The system of claim 12, wherein:
the at least one external electrode is located on outer surfaces of both the first and second ceramic side baffles; and
the electrical potential is configured to be provided to both the first and the second ceramic side baffles through the at least one external electrode.

14. The system of claim 13, wherein:
the at least one external electrode is electrically connected to an external power supply;
the at least one external electrode is not electrically connected to the fuel cell stack; and
the electrical potential is configured to be more negative than the lowest potential of any of the interconnects in the fuel cell stack.

15. The system of claim 14, wherein:
the at least one external electrode comprises a single electrically conductive strip which contacts the outer surfaces of both the first and second ceramic side baffles and which extends between the outer surfaces of both the first and second ceramic side baffles under a ceramic bottom block located below the fuel cell stack.

16. The system of claim 12, wherein the at least one external electrode is electrically connected to an interconnect of the fuel cell stack configured to have the lowest potential of all interconnects in the fuel cell stack or to the electrically conductive fuel cell stack or column component such that the electrical potential is equal to the lowest potential of any interconnect in the fuel cell stack or the electrically conductive fuel cell stack component.

17. The system of claim 12, wherein:
the electrical potential is configured to prevent or reduce diffusion of alkali or alkali earth metal from the first and second ceramic side baffles to the fuel cell stack, which prevents or reduces corrosion of components of the fuel cell stack;
the fuel cells comprise solid oxide fuel cells;
the fuel cell stack is located in a first column of a plurality of columns of fuel cell stacks;
the outer surfaces of the first and the second ceramic baffles face away from the first column;
the first and second ceramic side baffles extend along an entire height of the first column; and
the plurality of columns of fuel cell stacks are separated by inter-stack baffles.

18. The system of claim 17, wherein the at least one electrode extends along only a portion of the outer surface of at least one of the first and second ceramic side baffles to a height which is less than a total height of the first entire column.

19. The system of claim 17, wherein the at least one electrode extends along an entire outer surface of at least one of the first and second ceramic side baffles to a height which is equal to a height of the first entire column.

20. The system of claim 17, wherein:
- an alumina coating is located on the at least one external electrode;
- a dielectric is located between the ceramic side baffles and the inter-stack baffles;
- the dielectric comprises a ceramic felt or a ceramic matrix composite;
- the inter-stack baffles comprise a metal or metal alloy; and
- a dielectric felt seal is located between the fuel cell stack and the first ceramic side baffle.

* * * * *